United States Patent [19]

Paterson et al.

[11] Patent Number: 4,529,972

[45] Date of Patent: Jul. 16, 1985

[54] SIGNAL TRANSMITTING AND RECEIVING ARRANGEMENTS

[75] Inventors: Neil G. Paterson, Dunfermline; Alan D. Morrison, Falkirk, both of United Kingdom

[73] Assignee: Racal Security Limited, Newbridge, Scotland

[21] Appl. No.: 485,950

[22] Filed: Apr. 18, 1983

[30] Foreign Application Priority Data

Apr. 21, 1982 [GB] United Kingdom ............ 8211486

[51] Int. Cl.³ .................. G08B 13/18; G08B 13/24
[52] U.S. Cl. .................................. 340/554
[58] Field of Search ............ 340/554, 553, 552; 367/94; 343/5 PD

[56] References Cited

U.S. PATENT DOCUMENTS 3,828,336 8/1974 Massa .............................. 367/94
4,107,684 8/1978 Watson ........................... 340/552

FOREIGN PATENT DOCUMENTS 1220321 1/1971 United Kingdom .
1348782 3/1974 United Kingdom .

Primary Examiner—James L. Rowland
Assistant Examiner—Jeffery A. Hofsass
Attorney, Agent, or Firm—Leydig, Voit, Osann, Mayer & Holt

[57] ABSTRACT

The invention relates to intruder detection systems of the microwave radiation type in which a number of microwave transmitter/receiver units are placed around an area under surveillance. If a moving intruder is present, the microwave radiation emitted by one or more of the units will undergo a slight change when reflected back to the same unit. Mixing the received radiation within the transmitted radiation will therefore produce a low frequency output which can be detected by a Doppler amplifier. The Doppler amplifier will also produce an output if microwave radiation inadvertently received by that unit from another unit has a frequency which is such that the mixing produces a signal within the Doppler amplifier bandwidth. In order to prevent the latter signal causing a false alarm, any Doppler amplifier output is used to shift the frequency of a modulator controlling the pulse repetition frequency of the transmitted radiation. This shift in frequency will cause substantially no change in the Doppler amplifier output if the frequency shift is a shift caused by a moving intruder. However, if the signal is caused by mixing radiation inadvertently picked up from another unit, the Doppler amplifier output will be nulled when the change in transmitted radiation causes the signal to fall outside the Doppler amplifier bandwidth. In this way, false alarms can be prevented.

14 Claims, 2 Drawing Figures

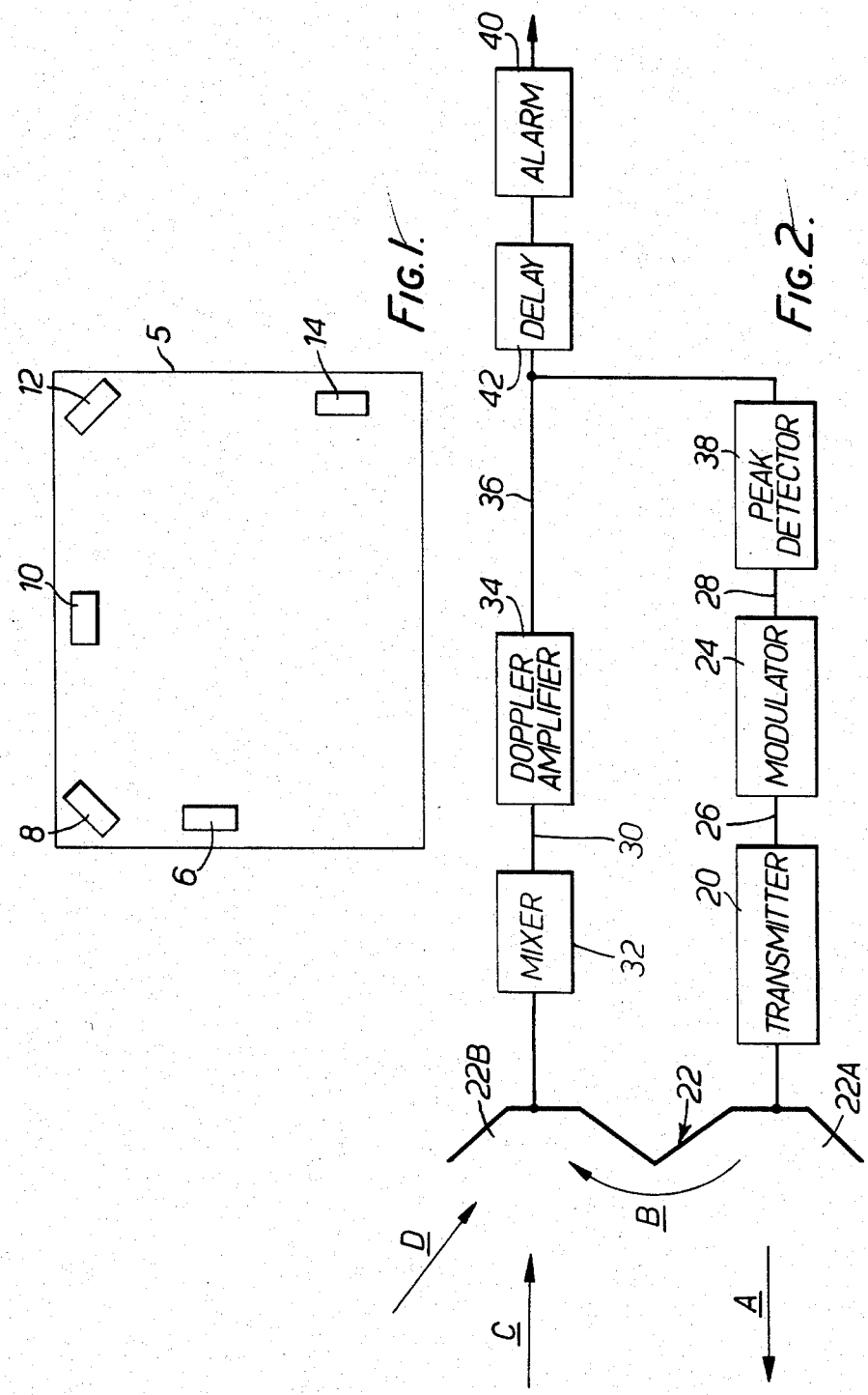

SIGNAL TRANSMITTING AND RECEIVING ARRANGEMENTS

BACKGROUND OF THE INVENTION

The invention relates to electrical circuit arrangements involving the transmission and reception of electromagnetic radiation, and is more specifically concerned with avoiding the effects at a receiver of unwanted interference between the outputs of two transmitters. The invention may, for example, be applied to intruder detection systems of the microwave radiation type in which microwave radiation is radiated into an area or areas under surveillance by a number of different microwave transmitters, and the effect on such radiation of an intruder is monitored by processing the radiation received by one or more microwave receivers. In one specific example of such an intruder detection system using a plurality of microwave transmitter/receiver units, each has an antenna which radiates microwave radiation, such as in pulsed form, into the area under surveillance and which receives radiation reflected back by objects in the area under surveillance. Each unit compares the transmitted and reflected radiation so as to detect the presence of an intruder by the Doppler shift caused to the frequency of the reflected radiation by the intruder's movement. In such systems, it is important that there should be no confusion between signals caused by movement of an intruder and signals caused by the effect, at a particular antenna, of the radiation received not by reflection of the radiation emitted by that antenna but received from the antenna of another transmitter/receiver unit. Radiation may be received from another transmitter/receiver unit either directly or by reflection such as by reflection from some stationary object within the area under surveillance. Such received radiation may cause production by that unit of a frequency difference, and in such a case, it is important that this frequency difference should not be misinterpreted as the presence of an intruder, causing a false alarm.

BRIEF SUMMARY OF THE INVENTION

According to the invention, there is provided an electrical circuit arrangement, comprising radiation transmission means, radiation receiving means operative to compare the frequency of the transmitted radiation received substantially directly with the frequency of any other radiation received thereby, whereby to produce an output signal in response to the difference (if any) between the frequencies of the compared radiation, and means responsive to the output signal to alter the frequency of, or the frequency of a component of, the transmitted radiation whereby the said frequency difference will persist if one of the compared frequencies is the frequency of radiation received via reflection of the transmitted radiation by a moving object but will tend to be brought to zero otherwise.

According to the invention, there is also provided an intruder alarm system, comprising a plurality of microwave radiation transmitter/receiver units, each of which has microwave transmission means for emitting microwave radiation into an area under surveillance, microwave receiving means for receiving the transmitted microwave radiation by reflection from any object within the area under surveillance and mixing that received radiation with the transmitted radiation and with any radiation received from any other said unit, whereby to produce an output signal when any frequency difference between the mixed radiations lies within a predetermined frequency range, and control means responsive to the output signal, if any, to alter the spectrum of the transmitted microwave radiation, whereby the output signal persists if the said object is a moving intruder but is nulled if the object is stationary, and alarm means operative to produce an intruder alarm signal if the output signal persists.

DESCRIPTION OF THE DRAWINGS

An electrical circuit arrangement embodying the invention and forming part of a microwave transmitter/receiver unit in an intruder detection system will now be described, by way of example, with reference to the accompanying diagrammatic drawings in which:

DESCRIPTION OF PREFERRED EMBODIMENTS

FIG. 1 is a block diagram of the intruder detection system; and

FIG. 2 is a block circuit diagram of the circuit arrangement.

FIG. 1 is purely diagrammatic and shows an area 5 under surveillance by means of intruder detection units 6, 8, 10, 12 and 14, which are intended to detect the presence of an intruder within the area. Each intruder detection unit 6–14 is in the form of a microwave transmitter/receiver, as will be descirbed in more detail below, and has a microwave antenna which emits microwave radiation at a particular frequency into the area 5. The microwave radiation will be reflected by any object within the area such as walls forming the boundaries of the area. The reflected radiation is picked up by the antenna of the transmitting unit and compared with the transmitted radiation. Under normal conditions, the received radiation will be substantially identical with the transmitted radiation. However, if an intruder moves through the path of microwave radiation transmitted by any of the units, so as to reflect the radiation back to that unit, this movement will cause a Doppler shift in the frequency of the received radiation at that unit as compared with the frequency of its transmitted radiation. This Doppler shift in frequency can therefore be detected and indicates the presence of an intruder. However, it is also possible that the microwave radiation transmitted by one unit may be inadvertently picked up by the antenna of another unit. At that other unit, this radiation will be mixed with the radiation received thereby reflection of the radiation transmitted by that unit. Such mixing may cause a signal due to the difference in frequency of the received radiation at that unit as compared with the transmitted radiation of that unit. Since such inadvertent mixing, and the resultant signal, may take place without any intruder being present, and however well the system is installed, it is important to prevent its causing a false alarm.

FIG. 2 shows the circuit diagram of one of the transmitter/receiver units. In this particular example, the microwave radiation is transmitted in pulses having a predetermined pulse repetition frequency. A microwave source 20 is connected to drive an antenna 22 having a transmitting section 22A and is pulsed by a modulator 24. The modulator 24 therefore emits control signals on a line 26 at the desired pulse repetition frequency, and each of the pulses switches on the microwave transmitter 20 to that the antenna 22 emits a pulse of microwave radiation as indicated at A. The modulator 24 does not have a fixed frequency output but a variable frequency output whose frequency is controlled by a control signal on a line 28. The modulator 24 may for example be in the form of a voltage controlled oscillator whose frequency is variable about a nominal value of, say, 50 kHz.

The operation will first be considered in the absence of any inadvertently received radiation from another transmitter.

The receiving section 22B of the antenna 22 will receive some microwave radiation directly from the transmitter section 22A via a direct path indicated digrammatically at B. In addition, however, the radiation transmitted by the transmitter section 22A will be reflected by any object within the area under surveillance and will be reflected back as shown at arrow C. The resultant signal on line 30 will therefore be produced by mixing of the two radiation components indicated by the arrows B and C in a mixer 32. This signal is passed to a Doppler amplifier 34. The Doppler amplifier is an amplifier having a low frequency passband. If the radiation received over the paths B and C has the same frequency, as will of course be the case where everything is static within the path of the microwave radiation emitted by the unit, there will be substantially no signal on line 30.

However, if there is a moving intruder present within the path of the transmitted radiation A, the radiation which the intruder reflects back as indicated by the arrow C will be shifted slightly in frequency by the Doppler effect, and the mixing, in the mixer 32, of this shifted frequency with the radiation at the transmitted frequency as received via the path indicated by the arrow B, will cause the signal on line 30 to have a low frequency component. This will be amplified by the Doppler amplifier 34 and produce a resultant output on line 36. The signal on line 36 is fed to a detecting unit 38 which may, for example, be a simple peak detecting circuit, and which therefore produces a control signal on line 28 in dependence on the magnitude of the signal on line 36. This control signal alters the spectrum of the transmitted microwave radiation by altering the modulation frequency output of the modulator 24.

However, assuming that the intruder is still present and moving within the path of the transmitted radiation, the radiation which he reflects back to the receiver section 22B as indicated by the arrow C will not only be altered by the shift in modulation frequency caused to the tramsmitted radiation by the change in control signal on line 28 but will also have a slight frequency shift caused by the Doppler effect. The mixing effect in the mixer 32 is such that the signal on line 30 is not affected by the shift in modulation frequency but only by the Doppler shift, and the Doppler amplifier 34 therefore continues to produce an output on line 36. This may or may not be the same as the value of the signal on that line initially, depending on whether or not the intruder is moving in substantially the same direction and speed as previously. If there is a change in his direction or speed, then of course the signal on line 30 will change correspondingly, in response to the Doppler effect, and the signal on line 36 will have a different magnitude. The detector 38 will thus cause a corresponding shift in the modulation frequency applied to the transmitted radiation. Again, however, this shift in modulation frequency would not itself produce any change in the signal on line 30. If the intruder is moving in substantially the same direction and speed, the signal on line 30 will be unchanged and there will be no further change in modulation frequency.

The result is, therefore, that the presence of a moving intruder within the path of the transmitted radiation A will cause a signal on line 36 to persist and this signal is passed to an alarm unit 40 via a delay unit 42 to indicate that an intruder is present.

However, as previously indicated, it is also possible for the receiving section 22B to receive some radiation from another of the transmitter/receiver units as indicated by the arrow D. The mixer 32 will therefore mix the signals B, C and D. Even if no intruder is present within the path of the transmitted radiation A, a signal on line 30 may nevertheless be produced, this signal being caused by the mixing of the three radiations, B, C and D in the mixer 32, assuming that the radiation via path D has one or more components close in frequency to the frequency of the radiations B and C. If the resultant signal on line 30 falls within the bandwidth of the amplifier 34, a corresponding signal will be produced on line 36, even though there is no intruder present in the path of the transmitted radiation A.

This signal on line 36 will be processed by the detector 38 to produce a change in value of the control signal on line 28 and thus a shift in the modulation frequency of the transmitted radiation A. A corresponding change in the received radiation B and C will therefore take place, though of course the received radiation D will not be affected. There will therefore be a change in frequency of the signal on line 30. If the signal on line 30 is still within the bandwidth of the Doppler amplifier 34, the signal on line 36 will persist and the output of detector 38 will change, causing a further shift in modulation frequency—which will again affect the frequency of the received radiations B and C but not the received radiation D.

This process will continue until the frequency of the signal on line 30 changes sufficiently to fall outside the bandwidth of the Doppler amplifier 34, thus bringing the signal on line 36 to zero (if, before this, the peak detector 38 reaches the limit of its range, it may be reset). The circuit arrangement thus automatically adjusts itself to such a situation. It is found that for practical values of the range of microwave transmitter frequencies and modulation frequencies used in any particular system, there are a number of values of modulation frequency which will cause the frequency of the signal on line 30 to fall outside the bandwidth of the Doppler amplfier 34, and the unit automatically adjusts the modulation frequency to one such value.

Therefore, because the signal on line 36 is rapidly brought to zero in such cases, the alarm circuit 40 is not activated and a false alarm is prevented.

It will be appreciated that the nulling effect described takes place substantially instantanously, and the time delay of the time delay circuit 42 is sufficiently short to prevent its adversely affecting the detection of any intruder.

Although the circuit arrangement has been described above with reference to a pulsed microwave radar source, it is not essential that this be the case. The circuit arrangement may, for example, be a CW radar system, and in such a case the control signal on line 28 would vary the actual carrier frequency, but the operation would otherwise be the same.

The detector 38 need not be a peak detector but can be any other suitable detector. It may, for example, be a "staircase" generating unit which is triggered by the presence of a signal on line 36, so as to produce a staircase output on line 28 which sweeps the modulation frequency (or the carrier frequency) through the predetermined range, but is brought to a halt when the signal on line 36 is nulled.

The Doppler amplifier 34 may be preceded by a gate operated at the modulation frequency by signal from the modulator 24 in order to improve the protection against interference.

What is claimed is:

1. An electrical circuit arrangement, comprising
   electromagnetic radiation transmission means radiating electromagnetic radiation at a predetermined transmitted frequency into an area to be monitored,
   radiation receiving means arranged to receive from the said area electromagnetic radiation from the said raidation transmission means, via reflection within the said area, and to receive electromagnetic radiation arising in the area from any other source of radiation,
   comparing means connected to compare the frequency of the radiation as actually transmitted by the radiation transmission means with the frequency of any radiation received by the radiation receiving means via the said reflection and with any radiation received by the radiation receiving means from any said other source of radiation, whereby to produce an output signal in response to the difference if any between the frequencies compared,
   control means responsive to the output signal to produce a control signal dependent thereon,
   frequency adjusting means connected to the radiation transmission means for controlling the predetermined transmitted frequency thereof, and
   means feeding the control signal to the frequency adjusting means to cause the adjusting means to alter the said predetermined transmitted frequency,
   whereby the said output signal will persist if the radiation receiving means is receiving the transmitted radiation after reflection by a moving said object within the said area but will tend to be brought to zero otherwise.

2. An arrangement according to claim 1, in which the comparing means comprises a Doppler amplifier.

3. An arrangement according to claim 1, in which the transmission means is a microwave radar source.

4. An arrangement according to claim 3, in which the transmission means is a pulsed radar source.

5. An arrangement according to claim 4, in which the frequency adjusting means comprises means responsive to the control signal to alter the modulation frequency of the pulsed radar source.

6. An arrangement according to claim 3, in which the radar source is a CW radar source.

7. An arrangement according to claim 6, in which the frequency adjusting means comprises means responsive to the control signal to alter the transmitted radiation frequency by altering its carrier frequency.

8. An arrangement according to claim 1, in which the said control means comprises a peak detector for peak-detecting the said output signal.

9. An intruder alarm system, comprising a plurality of microwave radiation transmitter/receiver units, each of which units includes
   microwave transmission means for emitting microwave radiation into an area under surveillance at a predetermined frequency
   microwave receiving means comprising means for receiving the transmitted microwave radiation by reflection from an object within the area under surveillance and susceptible to receiving radiation from at least one other said unit and means for mixing the frequencies of all the received radiation with the frequency of the transmitted radiation whereby to produce an output signal when any frequency difference between the mixed frequencies lies within a predetermined frequency range,
   control means responsive to the output signal, if any, to produce a control signal in dependence thereon,
   frequency adjusting means connected to the microwave transmission means for adjusting its frequency,
   means connecting the control signal to the frequency adjusting means to cause the frequency adjusting means to adjust the transmitted radiation frequency, whereby the output signal persists if the said object is a moving object but is nulled if the object is stationary, and
   alarm means operative to produce an intruder alarm signal if the output signal persists.

10. A system according to claim 9, in which the receiving means includes a Doppler amplifier having a bandwidth appropriate to movement of intruders to be detected.

11. A system according to claim 9, in which the transmission means is a pulsed radar source.

12. A system according to claim 11, in which the frequency adjusting means comprises means responsive to the control signal to alter the transmitted radiation frequency by changing the modulation frequency of the pulsed radar source.

13. A system according to claim 9, in which the transmission means is a CW radar source.

14. A system according to claim 13, in which the frequency adjusting means comprises means responsive to the control signal to adjust the transmitted radiation frequency by altering its carrier frequency.

* * * * *